United States Patent
Hashizume et al.

(10) Patent No.: US 7,389,033 B2
(45) Date of Patent: Jun. 17, 2008

(54) PLANAR LIGHTWAVE CIRCUIT TYPE VARIABLE OPTICAL ATTENUATOR

(75) Inventors: Yasuaki Hashizume, Yamato (JP); Yasuyuki Inoue, Isehara (JP); Takashi Saida, Sagamihara (JP); Akio Sugita, Ibaraki (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 10/598,856

(22) PCT Filed: Jan. 13, 2006

(86) PCT No.: PCT/JP2006/000372

§ 371 (c)(1),
(2), (4) Date: Apr. 10, 2007

(87) PCT Pub. No.: WO2006/075702

PCT Pub. Date: Jul. 20, 2006

(65) Prior Publication Data

US 2007/0212012 A1    Sep. 13, 2007

(30) Foreign Application Priority Data

Jan. 14, 2005    (JP) .............................. 2005-008207

(51) Int. Cl.
*G02B 6/00*    (2006.01)

(52) U.S. Cl. .................... 385/140; 385/11; 385/42; 385/14; 385/129; 385/130

(58) Field of Classification Search ............... 385/14, 385/11, 40, 41, 42, 16, 9, 27, 129, 130, 131, 385/132, 140

See application file for complete search history.

(56) References Cited

U.S. PATENT DOCUMENTS 5,974,216 A * 10/1999 Nakaya ...................... 385/140

(Continued)

FOREIGN PATENT DOCUMENTS

| JP | 2001-507817 | 6/2001 |
|---|---|---|
| JP | 2004-133389 | 4/2004 |
| WO | WO 98/29769 | 7/1998 |

OTHER PUBLICATIONS

Yasuyuki Inoue et al., *Polarization Sensitivity of a Silica Waveguide Thermooptic Phase Shifter for Planar Lightwave Circuits*, IEEE, Photonics Technology Letters, vol. 4, No. 1, Jan. 1992, pp. 36-38.

(Continued)

*Primary Examiner*—Brian M Healy
(74) *Attorney, Agent, or Firm*—Workman Nydegger

(57) ABSTRACT

A planar lightwave circuit type variable optical attenuator with a small polarization dependent loss is provided. By setting the waveguide birefringence (absolute value) in first and second optical coupler sections equal to or greater than $3.5 \times 10^{-4}$, the polarization mode coupling is made equal to or less than $-25$ dB, and the effect of the polarization dependence caused by the polarization mode coupling at the cross port of the first and second optical couplers is suppressed. In addition to or independently of this, the arm waveguide length can be designed to be equal to an integer multiple of the optical beat length obtained by dividing a used optical wavelength by the waveguide birefringence.

13 Claims, 12 Drawing Sheets

U.S. PATENT DOCUMENTS

| | | | |
|---|---|---|---|
| 6,507,680 B1 * | 1/2003 | Nishimura et al. | 385/14 |
| 6,714,706 B2 * | 3/2004 | Kambe | 385/41 |
| 6,867,904 B2 * | 3/2005 | Ng et al. | 359/332 |
| 2004/0141691 A1 * | 7/2004 | Wiesmann et al. | 385/40 |

OTHER PUBLICATIONS

Na Young Kim et al, *Limitation of PMD Compensation Due to Polarization-Dependent Loss in High-Speed Optical Tramsmission Links*, IEEE, Photonics Technology Letters, vol. 14, No. 1, Jan. 2002, pp. 104-105.

G. Heise et al., *Simple Model for Polarization Sensitivity of Silica Waveguide Mach-Zehnder Interferometer*, IEEE, Photonic Technology Letters, vol. 17, No. 10, Oct. 2005, pp. 2116-2118.

R. Narevich et al., *Novel Wide-Band Low-PDL Integrated Variable Optical Attenuator in Silica-on-Silicon*, Optical Fiber Communication Conference, Technical Digest OFC/NFOEC, vol. 4, 2005.

* cited by examiner

PLANAR LIGHTWAVE CIRCUIT TYPE VARIABLE OPTICAL ATTENUATOR

TECHNICAL FIELD

The present invention relates to a planar lightwave circuit type variable optical attenuator composed of optical waveguides on a substrate. More particularly, the present invention relates to a polarization independent planar lightwave circuit type variable optical attenuator that suppresses polarization mode coupling by setting the waveguide birefringence in component optical couplers at above a certain value, or that suppresses polarization dependent loss by setting the length of arm waveguides at an integer multiple of the birefringence optical beat length.

BACKGROUND ART

Recent requirements for greater communication capacity stimulate the development of optical wavelength division multiplexing communication systems (WDM systems) using a plurality of optical wavelengths. The optical wavelength division multiplexing communication systems are required to equalize the levels of individual wavelength signals from the viewpoint of nonlinearity suppression and crosstalk suppression. At present, to achieve the level equalization, planar lightwave circuit type variable optical attenuators are about to be used widely. Since the planar lightwave circuit type variable optical attenuators can be easily integrated such as by arraying, they have an advantage over bulk type, magnetooptics type, or MEMS (Micro Electro Mechanical System) type variable optical attenuators from the perspective of economic or miniaturization.

A planar lightwave circuit type variable optical attenuator will be described with reference to the accompanying drawings. FIG. 8 is a plan view showing a typical conventional planar lightwave circuit type variable optical attenuator. The planar lightwave circuit type variable optical attenuator 100 has input waveguides 101a and 101b, a first optical coupler 102, two arm waveguides 103 and 104, a phase controller 105 placed on the arm waveguides, a second optical coupler 106, output waveguides 107a and 107b, and a thin film heater 108. The reference numeral 110 designates a stress-releasing groove, which will be described later.

FIG. 9 is an enlarged sectional view taken along the line IX-IX of FIG. 8 when a conventional example having no stress-releasing grooves 110 is supposed. As shown in FIG. 9, the planar lightwave circuit type variable optical attenuator 100 employs a silicon substrate 109 having excellent thermal conductivity as its substrate, and has a structure in which the thin film heater 108 is placed on the surface of the embedded silica-based waveguides 103 and 104.

The operational principle of the planar lightwave circuit type variable optical attenuator 100 will be described briefly. The light entering the input waveguide 101a is divided into two parts through the first optical coupler 102, and they are fed to the two arm waveguides 103 and 104. The light beams traveling through the arm waveguides 103 and 104 having the phase controller 105 are combined again through the second optical coupler 106. In the course of this, they interfere with each other so that the light is output from the cross port output waveguide 107b when their phases are in phase, from the through port output waveguide 107a when their phases are out of phase by an amount π with each other, and from both of the two output waveguides 107a and 107b in accordance with their phase difference when the phase difference is between zero and π. The phase relationship between the two light beams when they enter the second optical coupler 106 is controlled by the phase controller 105 placed at the arm waveguide 104. As the phase controller 105, a thermooptic phase shifter is often used which is composed of the thin film heater 108 placed on the silica-based waveguides 103 and 104. Since the thermooptic effect is a phenomenon that has no polarization dependence theoretically, it has a characteristic of having a smaller polarization dependence than the electrooptic effect or photoelastic effect.

As described above, since the conventional planar lightwave circuit type variable optical attenuator utilizing the thermooptic effect can facilitate integration such as arraying, it has an advantage over the variable optical attenuator utilizing other technology such as the electrooptic effect or photo-elastic effect from the standpoint of cost and size reduction.

In practice, however, the conventional planar lightwave circuit type variable optical attenuator utilizing thermooptic effect has a problem of increasing the polarization dependent loss (PDL) when the attenuation of the variable optical attenuator is increased. FIG. 10 illustrates relationships between the optical attenuation and PDL of the variable optical attenuator with the cross-sectional construction in FIG. 9. As illustrated in FIG. 10, a large PDL of nearly 4 dB occurs at the optical attenuation of 15 dB. The large PDL at the optical attenuation offers a serious problem in the operation of a current optical communication system that does not specifies the polarization state in an optical fiber. It has been the greatest factor of preventing the planar lightwave circuit type variable optical attenuators from spreading.

Thus, the conventional planar lightwave circuit type variable optical attenuator has a problem to be solved in that the optical attenuator has a large polarization dependent loss when the optical attenuation of the variable optical attenuator is increased.

Non-patent document 1: Y. Inoue et al., "Polarization sensitivity of a silica waveguide thermo-optic phase shifter for planar lightwave circuits", IEEE Photon. Technol. Lett., vol. 4, no. 1, pp. 36-38, January 1992.

Non-patent document 2: KIM et al., "Limitation of PMD Compensation Due to Polarization-Dependent Loss in High-Speed Optical Transmission Links", IEEE PHOTONICS TECHNOLOGY LETTERS, VOL. 14, NO. 1, January 2002.

DISCLOSURE OF THE INVENTION

An object of the present invention to provide a planar lightwave circuit type variable optical attenuator with a small polarization dependent loss by solving the problem of the polarization dependent loss of the planar lightwave circuit type variable optical attenuator.

To accomplish the foregoing object, according to a first aspect of the present invention, there is provided a planar lightwave circuit type variable optical attenuator having waveguides formed on a substrate, the planar lightwave circuit type variable optical attenuator comprising: an input waveguide; a first optical coupler; a second optical coupler; two arm waveguides connecting the first optical coupler to the second optical coupler; and an output waveguide, wherein each of the first optical coupler and the second optical coupler is a directional coupler having a region in which the two arm waveguides are brought in close proximity to each other; and a polarization mode coupling in the first optical coupler and the second optical coupler is equal to or less than −25 dB.

Here, the absolute value of the waveguide birefringence at optical coupler sections constituting the first optical coupler and second optical coupler can be made equal to or greater than $3.5 \times 10^{-4}$.

The first optical coupler and second optical coupler can be a directional coupler constructed by bringing the two arm waveguides in close proximity to each other.

The length of the arm waveguides can be designed to be equal to an integer multiple of an optical beat length obtained by dividing a used optical wavelength by the waveguide birefringence.

Preferably, at least one of the two arm waveguides can have a phase controller; and thereby the planar lightwave circuit type variable optical attenuator can function as a variable optical attenuator or optical switch.

Preferably, the substrate can be a silicon substrate, and the waveguides can be silica-based glass waveguides.

According to the present invention, the foregoing configuration can implement a planar lightwave circuit type variable optical attenuator, optical switch and optical filter with a small PDL (polarization dependent loss) at the optical attenuation. As a result, according to the present invention, the planar lightwave circuit type variable optical attenuator, optical switch and optical filter that are small in size and good suitable for integration become practical. Thus, the present invention contributes to the economization or cost reduction of communication systems such as optical wavelength division multiplexing communication systems.

Figure 1:
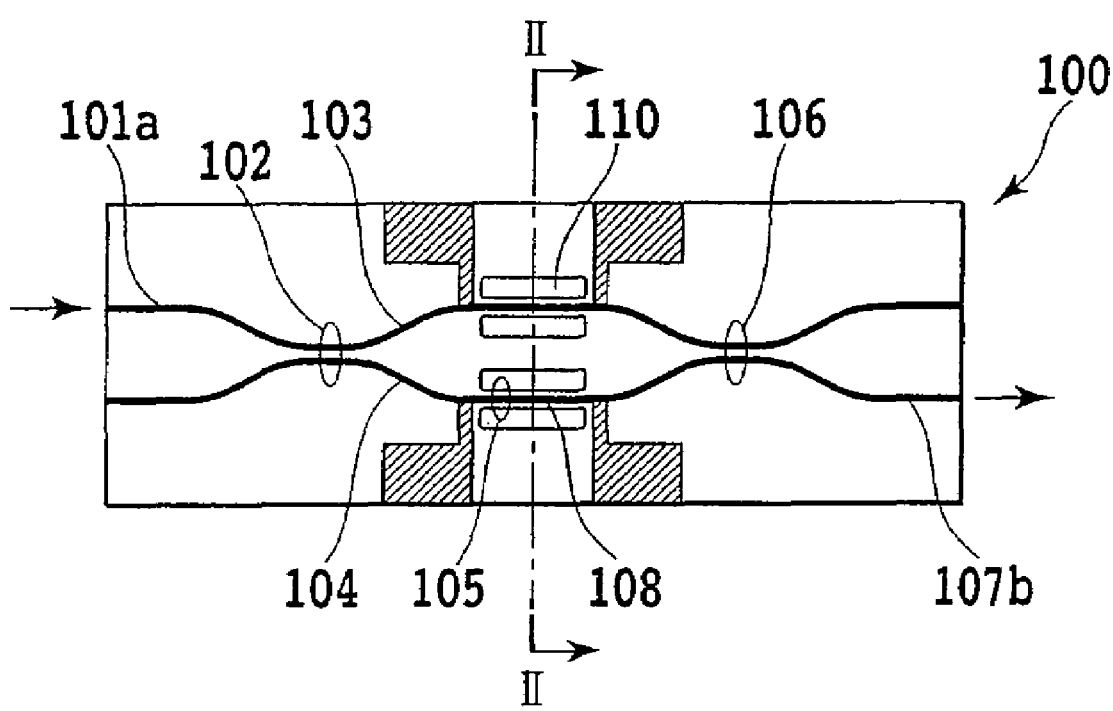
FIG. 1 is a plan view showing a structure of a planar lightwave circuit type variable optical attenuator of a first embodiment in accordance with the present invention.

BEST MODE FOR CARRYING OUT THE INVENTION (PDL Generation Model and Necessary Conditions for Suppressing PDL)

Before describing concrete embodiments in accordance with the present invention, a researched conclusion will be described of the polarization dependent loss factor of the planar lightwave circuit type variable optical attenuator.

It is described before in connection with the conventional technology that the thermooptic effect in the silica-based glass is basically a phenomenon without the polarization dependent loss. Here, the reason why the planar lightwave circuit type variable optical attenuator has a polarization dependent loss will be described with reference to FIG. 8 and FIG. 9 as follows. The following two factors are conceivable as principal factors of the polarization dependent loss. One of them is the polarization dependent loss of the thermooptic phase shifter 105, and the other of them is a polarization mode coupling of the optical couplers 102 and 106.

First, the non-patent document 1 presents a report on the polarization dependent loss of the former thermooptic phase shifter 105. The following is a brief description of the contents of the report. The silica-based waveguides 103 and 104 that are made local heat up by the thin film heater 108 are about to expand. In this case, although they can expand in a direction perpendicular to the substrate 109 (in the upward direction of FIG. 9), they cannot expand in a direction parallel to the substrate 109 (in a lateral direction of FIG. 9) because they are surrounded with a silica-based glass (cladding) 111 that is not heated. As a result, strong compressive stress occurs in a direction parallel to the surface of the substrate 109. The compressive stress increases the refractive indices of the waveguides (cores) 103 and 104 because of the photo-elastic effect caused by the compressive stress. Accordingly, as for the waveguides 103 and 104 beneath the thin film heater 108, their refractive indices increase because of the photo-elastic effect due to the local thermal expansion of the glass as well as the thermooptic effect involved in the temperature rise. Thus, although the thermooptic effect itself has no polarization dependent loss, since the stress caused by the thermal expansion has anisotropy, the refractive index changes due to the photo-elastic effect depend on polarizations.

Figure 9:
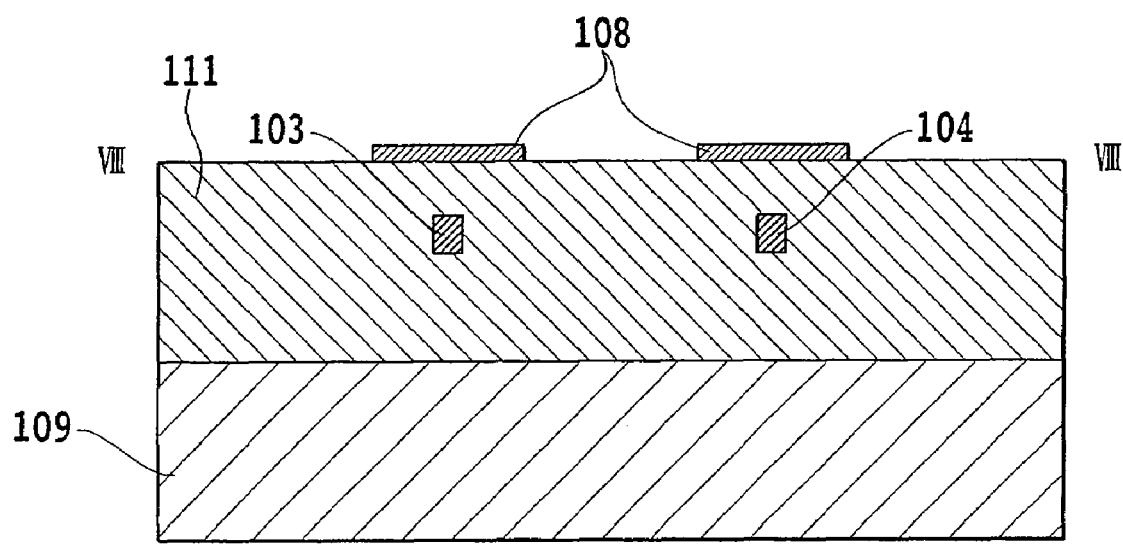
FIG. 9 is an enlarged sectional view showing an enlarged cross-sectional construction of the planar lightwave circuit type variable optical attenuator based on the conventional technology.
Figure 10:
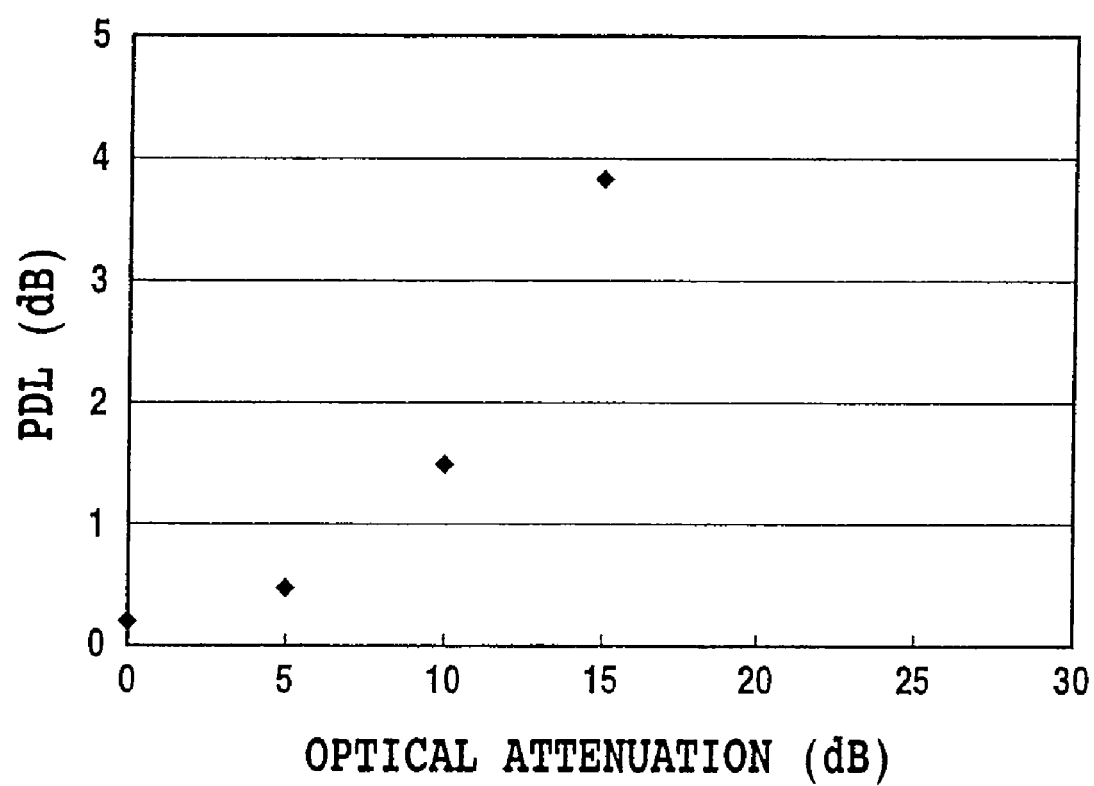
FIG. 10 is a characteristic diagram illustrating relationships between the optical attenuation and polarization dependent loss (PDL) in the planar lightwave circuit type variable optical attenuator of the conventional technology.
Figure 11:
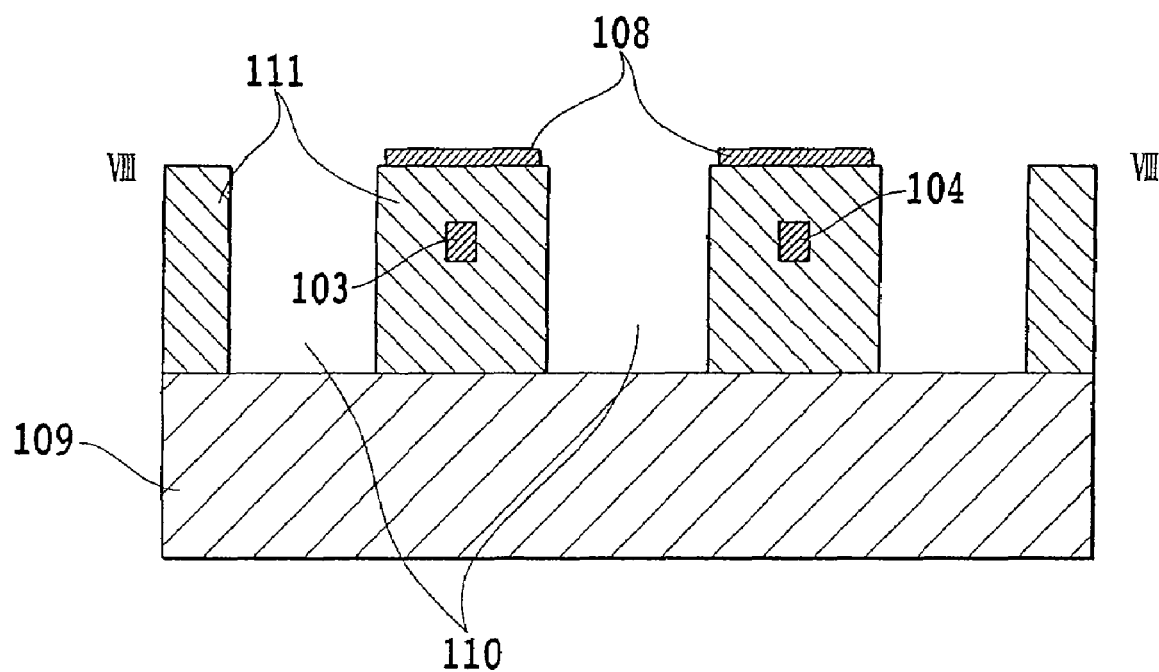
FIG. 11 is an enlarged sectional view showing an enlarged cross-sectional construction of the planar lightwave circuit type variable optical attenuator with stress-releasing grooves based on the conventional technology.
Figure 12:
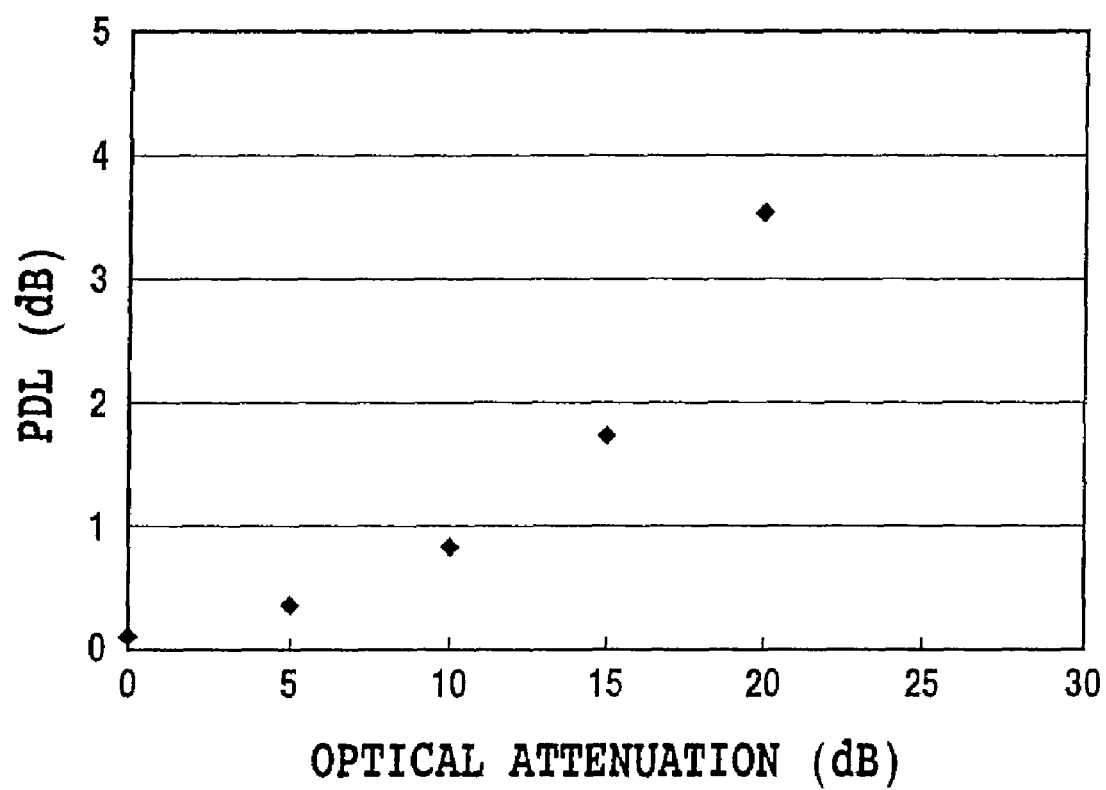
FIG. 12 is a characteristic diagram illustrating relationships between the optical attenuation and polarization dependent loss (PDL) in the variable optical attenuator with the stress-releasing grooves of the conventional technology.

The polarization dependence of the thermooptic phase shifter because of the photo-elastic effect can be suppressed to some extent by forming stress-releasing grooves 110 on both sides of the thermooptic phase shifter 105 (and thin film heater 108) as shown in FIG. 11. FIG. 12 illustrates relationships between the optical attenuation and PDL of the variable optical attenuator having the stress-releasing grooves 110 as shown in FIG. 11. The variable optical attenuator with the cross-sectional construction of FIG. 9 has a PDL of 3.8 dB at 15 dB attenuation (see FIG. 10). In contrast with this, the variable optical attenuator with the stress-releasing grooves of FIG. 11 can reduce the PDL to 1.7 dB, less than half the value of 3.8 dB. However, the PDL of 1.7 dB at the 15 dB attenuation is not sufficient value for practice use of the current optical communication system, and further suppression of the PDL is required. The present invention aims at achieving a PDL of 0.5 dB or less at the 15 dB attenuation, which is required for the practice use of the current optical communication system (non-patent document 2).

The stress-releasing grooves 110 of FIG. 11, which are allocated at both sides of the thin film heater 108, have a function of heat-insulating grooves for preventing the heat produced by the thin film heater 108 from heating regions other than the waveguides. Accordingly, they are effective for reducing power consumption of the thermooptic phase shifter as well.

Figure 8:
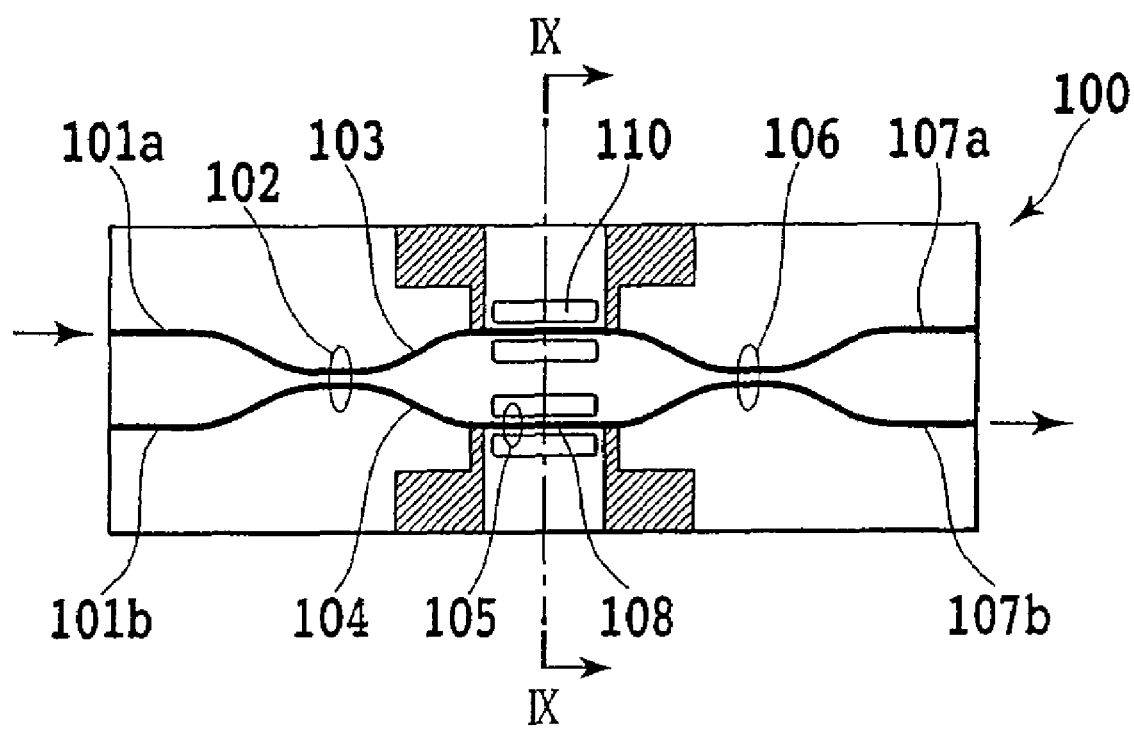
FIG. 8 is a plan view showing a planar lightwave circuit type variable optical attenuator based on conventional technology.

Next, the polarization dependent loss due to the polarization mode coupling of the optical couplers will be described. Here, we assume as the optical couplers the directional couplers 102 and 106 constructed by placing the two waveguides in close proximity to each other as shown in FIG. 8. Generally, as for the waveguides on a plane substrate, the coupling between polarization modes does not occur unless the disturbance is present. However, since the cores are placed in close proximity to each other at the directional couplers, the cores undergo force in the direction that brings them closeness at burying the cores into the over-cladding layer. The following is a more specific description. When forming the over cladding using a flame hydrolysis deposition method, during the process of thermal treatment for increasing the transparency carried out after the deposition of fine glass particles on and around the cores, the fine glass particles cover the cores while being melted and compacted. However, since the fine glass particles are not supplied sufficiently to the region sandwiched between the two cores, the glass in the region becomes rough, and the two cores are pressed inward from both the outsides. Since the pressure inclines the principal axes of the waveguides, coupling between the polarization modes occurs. Thus, some part of the cross port light coupled through the directional coupler brings about the polarization mode coupling. On the other hand, as the two cores separate from each other, the principal axes return to their original positions, both top and bottom, left and right. Accordingly, the through port light does not cause the polarization mode coupling.

Such a phenomenon not only occurs in the directional couplers, but also occurs without exception in the case where the two arm waveguides are placed in close proximity to each other. Thus, the polarization mode coupling occurs even in a multimode interference coupler or asymmetric x-type demultiplexer because the two arm waveguides are brought into close proximity to each other at the input/output terminals. Next, the light propagation through the optical coupler under the polarization mode coupling condition will be analyzed with reference to FIG. 8. The light propagating from the first input waveguide (input port) 101*a* to the first output waveguide (output port) 107*a* via the first arm waveguide 103 is expressed by the following expression (1); the light propagating from the first input waveguide 101*a* to the first output waveguide 107*a* via the second arm waveguide 104 is expressed by the following expression (2); the light propagating from the first input waveguide 101*a* to the second output waveguide 107*b* via the first arm waveguide 103 is expressed by the following expression (3); and the light propagating from the first input waveguide 101*a* to the second output waveguide 107*b* via the second arm waveguide 104 is expressed by the following expression (4).

Here, the first rows of the matrices of the following expressions represent a TE component, and the second rows represent a TM component. In addition, $I_{TE\ (TM)}$ designates the TE (TM) component of the input light; $\kappa$ designates the coupling efficiency of the optical coupler; $\alpha$ designates a gradient of the principal axis in the optical coupler; and $\theta_{1\ (2)\ TE\ (TM)}$ designates a phase change of the TE (TM) component in the first (second) arm waveguide 103 (104). The cross port polarization mode coupling in the optical coupler is represented by $\sin 2\alpha$.

$$\begin{pmatrix} \cos\alpha & -j\cdot\sin\alpha \\ -j\cdot\sin\alpha & \cos\alpha \end{pmatrix}\sqrt{1-\kappa^2}\begin{pmatrix} \cos\alpha & j\cdot\sin\alpha \\ j\cdot\sin\alpha & \cos\alpha \end{pmatrix} \quad (1)$$

$$\begin{pmatrix} e^{j\theta_{1TE}} & 0 \\ 0 & e^{j\theta_{1TM}} \end{pmatrix}\cdot\begin{pmatrix} \cos\alpha & -j\cdot\sin\alpha \\ -j\cdot\sin\alpha & \cos\alpha \end{pmatrix}\sqrt{1-\kappa^2}$$

$$\begin{pmatrix} \cos\alpha & j\sin\alpha \\ j\cdot\sin\alpha & \cos\alpha \end{pmatrix}\begin{pmatrix} I_{TE} \\ I_{TM} \end{pmatrix} = (1-\kappa^2)\begin{pmatrix} I_{TE}e^{j\theta_{1TE}} \\ I_{TM}e^{j\theta_{1TM}} \end{pmatrix}$$

$$\begin{pmatrix} \cos\alpha & -j\cdot\sin\alpha \\ -j\cdot\sin\alpha & \cos\alpha \end{pmatrix}j\kappa\begin{pmatrix} \cos\alpha & -j\cdot\sin\alpha \\ -j\cdot\sin\alpha & \cos\alpha \end{pmatrix} \quad (2)$$

$$\begin{pmatrix} e^{j\theta_{2TE}} & 0 \\ 0 & e^{j\theta_{2TM}} \end{pmatrix}\cdot\begin{pmatrix} \cos\alpha & j\cdot\sin\alpha \\ j\cdot\sin\alpha & \cos\alpha \end{pmatrix}j\kappa\begin{pmatrix} \cos\alpha & j\cdot\sin\alpha \\ j\cdot\sin\alpha & \cos\alpha \end{pmatrix}\begin{pmatrix} I_{TE} \\ I_{TM} \end{pmatrix} =$$

$$-\kappa^2\begin{pmatrix} I_{TE}(e^{j\theta_{2TE}}\cos^2 2\alpha + e^{j\theta_{2TM}}\sin^2 2\alpha) + \\ jI_{TM}(e^{j\theta_{2TE}} - e^{j\theta_{2TM}})\sin 2\alpha\cos 2\alpha \\ jI_{TE}(-e^{j\theta_{2TE}} + e^{j\theta_{2TM}})\sin 2\alpha\cos 2\alpha + \\ I_{TM}(e^{j\theta_{2TE}}\sin^2 2\alpha + e^{j\theta_{2TM}}\cos^2 2\alpha) \end{pmatrix}$$

$$\begin{pmatrix} \cos\alpha & j\cdot\sin\alpha \\ j\cdot\sin\alpha & \cos\alpha \end{pmatrix}j\kappa\begin{pmatrix} \cos\alpha & j\cdot\sin\alpha \\ j\cdot\sin\alpha & \cos\alpha \end{pmatrix} \quad (3)$$

-continued $$\begin{pmatrix} e^{j\theta_{1TE}} & 0 \\ 0 & e^{j\theta_{1TM}} \end{pmatrix} \cdot \begin{pmatrix} \cos\alpha & -j\cdot\sin\alpha \\ -j\cdot\sin\alpha & \cos\alpha \end{pmatrix}$$

$$\sqrt{1-\kappa^2}\begin{pmatrix} \cos\alpha & j\cdot\sin\alpha \\ j\cdot\sin\alpha & \cos\alpha \end{pmatrix}\begin{pmatrix} I_{TE} \\ I_{TM} \end{pmatrix} =$$

$$jk\sqrt{1-\kappa^2}\begin{pmatrix} I_{TE}e^{j\theta_{1TE}}\cos 2\alpha + jI_{TM}e^{j\theta_{1TM}}\sin 2\alpha \\ jI_{TE}e^{j\theta_{1TE}}\sin 2\alpha + I_{TM}e^{j\theta_{1TM}}\cos 2\alpha \end{pmatrix}.$$

Case of $I_1 \rightarrow arm_2 \rightarrow O_2$:

$$\begin{pmatrix} \cos\alpha & -j\cdot\sin\alpha \\ -j\cdot\sin\alpha & \cos\alpha \end{pmatrix}\sqrt{1-\kappa^2}\begin{pmatrix} \cos\alpha & j\cdot\sin\alpha \\ j\cdot\sin\alpha & \cos\alpha \end{pmatrix} \quad (4)$$

$$\begin{pmatrix} e^{j\theta_{2TE}} & 0 \\ 0 & e^{j\theta_{2TM}} \end{pmatrix} \cdot \begin{pmatrix} \cos\alpha & j\cdot\sin\alpha \\ j\cdot\sin\alpha & \cos\alpha \end{pmatrix} j\kappa \begin{pmatrix} \cos\alpha & j\cdot\sin\alpha \\ j\cdot\sin\alpha & \cos\alpha \end{pmatrix}\begin{pmatrix} I_{TE} \\ I_{TM} \end{pmatrix} =$$

$$jk\sqrt{1-k^2}\begin{pmatrix} I_{TE}e^{j\theta_{2TE}}\cos 2\alpha + jI_{TM}e^{j\theta_{2TE}}\sin 2\alpha \\ jI_{TE}e^{j\theta_{2TM}}\sin 2\alpha + I_{TM}e^{j\theta_{2TM}}\cos 2\alpha \end{pmatrix}$$

The through port output from the first input waveguide 101a to the first output waveguide 107a is given by the following expression (5), which is the sum of the foregoing expression (1) and the foregoing expression (2).

$$\begin{pmatrix} I_{TE}\{(1-\kappa^2)e^{j\theta_{1TE}} - \kappa^2(e^{j\theta_{2TE}}\cos^2 2\alpha + e^{j\theta_{2TM}}\sin^2 2\alpha)\} - \\ jI_{TM}\kappa^2(e^{j\theta_{2TE}} - e^{j\theta_{2TM}})\sin^2 2\alpha\cos 2\alpha - \\ jI_{TE}\kappa^2(-e^{j\theta_{2TE}} + e^{j\theta_{2TM}})\sin 2\alpha\cos 2\alpha + I_{TM} \\ \{(1-\kappa^2)e^{j\theta_{1TM}} - \kappa^2(e^{j\theta_{2TE}}\sin^2 2\alpha + e^{j\theta_{2TM}}\cos^2 2\alpha)\} \end{pmatrix} \quad (5)$$

To improve the outlook in the foregoing expression (5), the following expression (6) is assumed as the coupling ratio of the optical coupler.

$$\kappa^2 = \frac{1}{2} \quad (6)$$

Since the through port output undergoes the maximum attenuation when the lengths of the two arm waveguides are equal, the maximum attenuation condition is given by the following expression (7).

$$e^{j\theta_{1TE}} = e^{j\theta_{2TE}}, \quad e^{j\theta_{1TM}} = e^{j\theta_{2TM}} \quad (7)$$

By substituting the foregoing expressions (6) and (7) into the foregoing expression (5), the condition is obtained for always keeping the foregoing expression (5)=0 independently of the polarization state. It gives the polarization independent condition. Here, the term "independent of the polarization state" means that it depends neither on the intensity ratio between $I_{TE}$ and $I_{TM}$ or on the phase difference.

$$\frac{(e^{j\theta_{1TE}} - e^{j\theta_{1TM}})\sin 2\alpha}{2}\begin{pmatrix} I_{TE}\sin 2\alpha - jI_{TM}\cos 2\alpha \\ jI_{TE}\cos 2\alpha - I_{TM}\sin 2\alpha \end{pmatrix} = \begin{pmatrix} 0 \\ 0 \end{pmatrix} \quad (8)$$

As the polarization independent condition, the following expression (9) is derived from the foregoing expression (8), where m is an integer.

$$\sin 2\alpha = 0$$

or $$\theta_{1TE} - \theta_{1TM} = 2\,m\pi \quad (9)$$

Here, in the first arm waveguide 103, $\theta_{1TE}$, $\theta_{1TM}$ and B are defined by the following expressions (10), (11) and (12) where L is the length of the arm waveguide, $\lambda$ is the wavelength employed, $n_{1TM}$ is the effective index of the TM light, $n_{1TE}$ is the effective index of the TE light and B is the waveguide birefringence.

$$\theta_{1TE} = 2\pi\frac{n_{1TE}L}{\lambda} \quad (10)$$

$$\theta_{1TM} = 2\pi\frac{n_{1TM}L}{\lambda} \quad (11)$$

$$B = n_{1TM} - n_{1TE} \quad (12)$$

The following expression (13) is obtained by substituting these expressions (10) and (11) into the lower expression (called "second expression" from now on) of the foregoing expression (9), and by applying the expression (12).

$$L = -m\frac{\lambda}{B} \quad (13)$$

Thus, it is found from the foregoing expressions (9) and (13) that the polarization dependent loss of the through port output can be eliminated when the polarization mode coupling (sin 2α) becomes zero in the optical coupler, or when the length (L) of the arm waveguides is an integer multiple (m) of the optical beat length obtained by dividing the optical wavelength employed(λ) by the waveguide birefringence (B).

Likewise, the cross port output from the first input waveguide 101a to the second output waveguide 107b is given by the following expression (14), which is the sum of the foregoing expression (3) and the foregoing expression (4).

$$j\kappa\sqrt{1-\kappa^2}\begin{pmatrix} I_{TE}(e^{j\theta_{1TE}} + e^{j\theta_{2TE}})\cos 2\alpha + \\ jI_{TM}(e^{j\theta_{1TM}} + e^{j\theta_{2TE}})\sin 2\alpha \\ jI_{TE}(e^{j\theta_{1TE}} + e^{j\theta_{2TM}})\sin 2\alpha + \\ I_{TM}(e^{j\theta_{1TM}} + e^{j\theta_{2TM}})\cos 2\alpha \end{pmatrix} \quad (14)$$

The cross port output undergoes the maximum attenuation when the difference between the lengths of the two arm waveguides is half the optical wavelength employed. The condition is represented by the following expression (15).

$$e^{j\theta_{1TE}} + e^{j\theta_{2TE}} = e^{j\theta_{1TM}} + e^{j\theta_{2TM}} = 0 \quad (15)$$

By substituting the foregoing expression (15) into the foregoing expression (14), the condition is obtained for always keeping the foregoing expression (14)=0 independently of the polarization state. It gives the polarization independent condition.

$$-\kappa\sqrt{1-\kappa^2}\sin 2\alpha \begin{pmatrix} I_{TM}(e^{j\theta 1TM} - e^{j\theta 1TE}) \\ I_{TE}(e^{j\theta 1TE} - e^{j\theta 1TM}) \end{pmatrix} = \begin{pmatrix} 0 \\ 0 \end{pmatrix} \quad (16)$$

As the polarization independent condition, the following expression (17) is derived from the foregoing expression (16).

$$\sin 2\alpha = 0$$

or $$\theta_{1TE} - \theta_{1TM} = 2\ m\pi \quad (17)$$

The foregoing expression (17) equals the foregoing expression (9). Accordingly, the foregoing expression (13) is obtained from the foregoing expression (17). Thus, the polarization dependent loss of the through port output and that of the cross port output can be eliminated when the polarization mode coupling (sin 2α) becomes zero in the optical coupler, or when the length (L) of the arm waveguides is an integer multiple (m) of the optical beat length obtained by dividing the optical wavelength employed (λ) by the waveguide birefringence (B).

From the foregoing consideration, the conditions are obtained which are necessary for suppressing the polarization dependent loss of the planar lightwave circuit type variable optical attenuator and optical switch.

The embodiments in accordance with the present invention will now be described in detail with reference to the accompanying drawings.

FIRST EMBODIMENT

FIG. 1 shows a structure of a planar lightwave circuit type variable optical attenuator of the first embodiment in accordance with the present invention. The planar lightwave circuit type variable optical attenuator 100 has an input waveguide 101a, a first optical coupler 102, two arm waveguides 103 and 104, a phase controller 105 placed on the arm waveguides, a second optical coupler 106, an output waveguide 107b, thin film heaters 108, and stress-releasing grooves 110. The embodiment uses the waveguide 107b, which is located at the cross port with respect to the input waveguide 101a, as the output waveguide. The reason for using the cross port output is that when the directional couplers used as the first and second optical couplers 102 and 106 have the same design, their coupling ratios are nearly equal, as a result of which a high variable optical attenuation is achieved.

Figure 2:
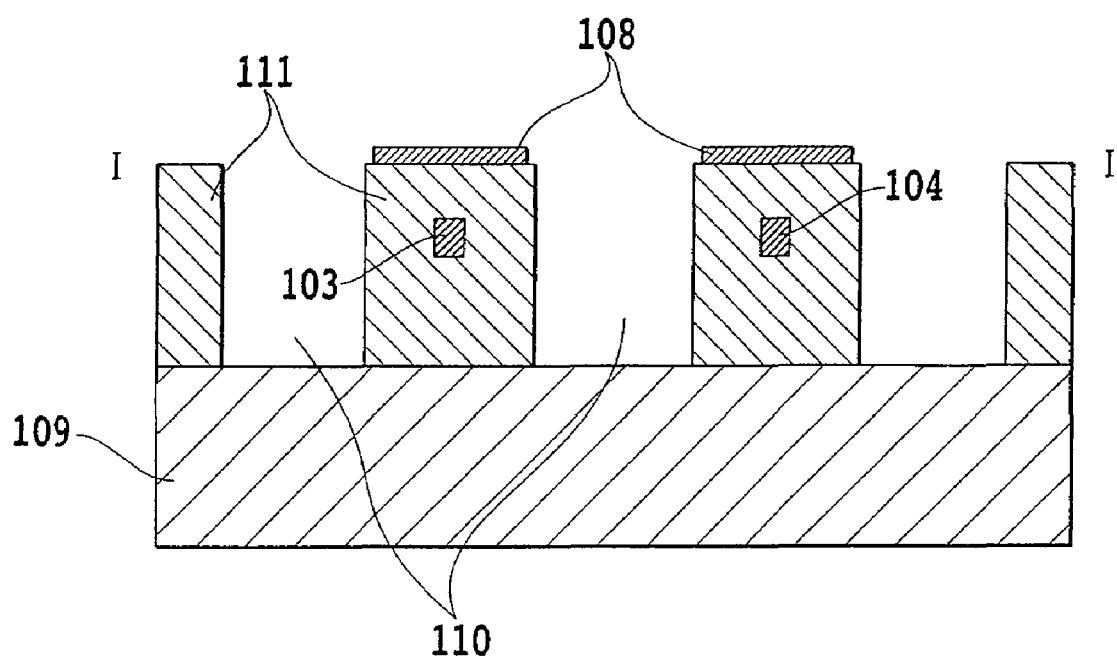
FIG. 2 is an enlarged sectional view showing an enlarged cross-sectional construction of the planar lightwave circuit type variable optical attenuator of the first embodiment in accordance with the present invention.

FIG. 2 is an enlarged sectional view taken along the section line II-II of FIG. 1. Its basic circuit structure is the same as that of FIG. 11 described in connection with the conventional technology. The embodiment differs from the conventional technology in that the absolute value of the waveguide birefringence of the directional couplers 102 and 106 constituting the first and second optical couplers is set at a value equal to or greater than 3.5×10⁻⁴. Here, the waveguide birefringence B equals the difference between the TM mode effective index $n_{TM}$ and the TE mode effective index $n_{TE}$ ($B=n_{TM}-n_{TE}$) as defined by the expression (12).

The fabrication process of the waveguides of the embodiment will be described briefly with reference to process diagrams of FIGS. 3A-3E. Under-cladding fine glass particles 301 mainly composed of $SiO_2$ and core fine glass particles 302 composed of $SiO_2$ doped with $GeO_2$ are deposited on a silicon substrate 109 by a flame hydrolysis deposition method (FHD) (see FIG. 3A). At this step, since the fine glass particles 301 and 302 scatter light, they appear as an opacity film.

After that, the glass is made transparent at a high temperature above 1,000° C. When the silicon substrate 109 having the fine glass particles 301 and 302 deposited on its surface is heated gradually, the fine glass particles melt, thereby forming a transparent glass film. In this case, the deposition amount of the fine glass particles are controlled in such a manner that an under-cladding glass layer 303 becomes 30 μm thick, and the core glass layer 304 becomes 7 μm thick (see FIG. 3B).

Continuously, the core glass layer 304 is patterned using the photolithography technique and reactive ion etching (RIE). Thus, the cores 305 are formed on the under-cladding glass layer 303 (see FIG. 3C).

Figure 3A:
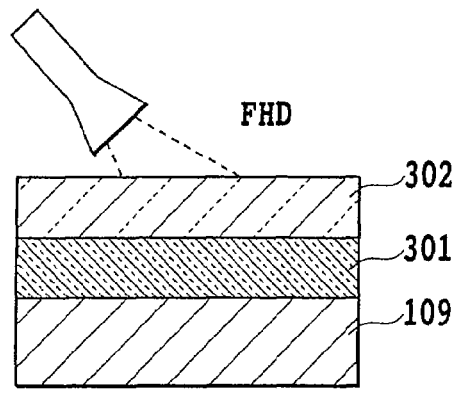
FIG. 3A is a process diagram showing a waveguide fabrication process of the planar lightwave circuit type variable optical attenuator of the first embodiment in accordance with the present invention.
Figure 3B:
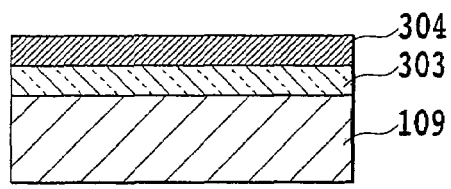
FIG. 3B is a process diagram showing the waveguide fabrication process of the planar lightwave circuit type variable optical attenuator of the first embodiment in accordance with the present invention.
Figure 3C:
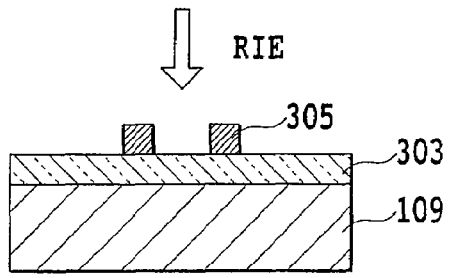
FIG. 3C is a process diagram showing the waveguide fabrication process of the planar lightwave circuit type variable optical attenuator of the first embodiment in accordance with the present invention.
Figure 3D:
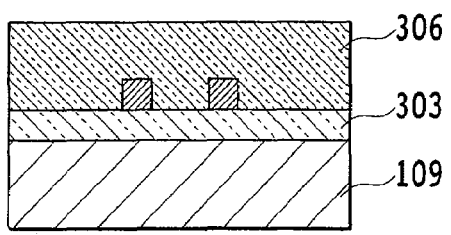
FIG. 3D is a process diagram showing the waveguide fabrication process of the planar lightwave circuit type variable optical attenuator of the first embodiment in accordance with the present invention.

Then, $SiO_2$ over-cladding fine glass particles 306 are deposited on the under-cladding glass layer 303 and cores 305 by the flame hydrolysis deposition method (FHD) (see FIG. 3D).

Figure 3E:
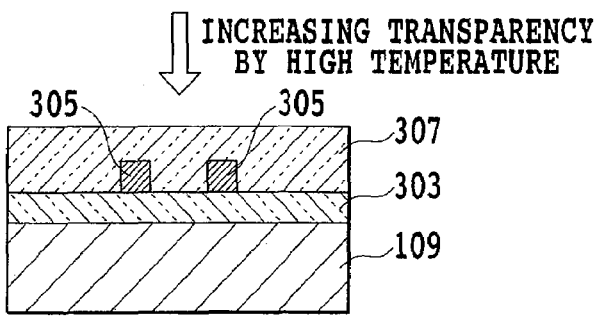
FIG. 3E is a process diagram showing the waveguide fabrication process of the planar lightwave circuit type variable optical attenuator of the first embodiment in accordance with the present invention.

Finally, an embedded waveguide is formed which has a transparent over-cladding glass layer 307 made transparent through the high temperature (see FIG. 3E). A dopant is added to the over-cladding glass layer 307 to lower the glass transition temperature, thereby preventing the cores 305 from changing the shape in the process of making the over-cladding glass layer 307 transparence under the high temperature. Here, the over-cladding glass layer (called "over-cladding layer" from now on) 307 and the under-cladding glass layer (called "under-cladding layer" from now on) 303 shown in FIG. 3E correspond to the cladding 111 of FIG. 2, and the cores 305 correspond to the waveguides (cores) 103 and 104 of FIG. 2.

The waveguide birefringence depends on the aspect ratio of the cores 305, the thermal expansion coefficients of the substrate 109, core glass 305 and cladding glasses 303 and 307, and the softening temperature of the glasses. Accordingly, the waveguide birefringence can be controlled by appropriately selecting these values.

To fabricate the planar lightwave circuit type variable optical attenuator, in addition to the steps described in connection with FIGS. 3A-3E, the following steps are taken: a step of forming the thin film heaters 108 as shown in FIG. 1 and FIG. 2 and wiring electrodes on the surface of the over-cladding layer 307; and a step of forming the stress-releasing grooves 110 as shown in FIG. 1 and FIG. 2 to suppress the polarization dependence due to the thermal stress generated by the thermooptic phase shifter 105.

Figure 4:
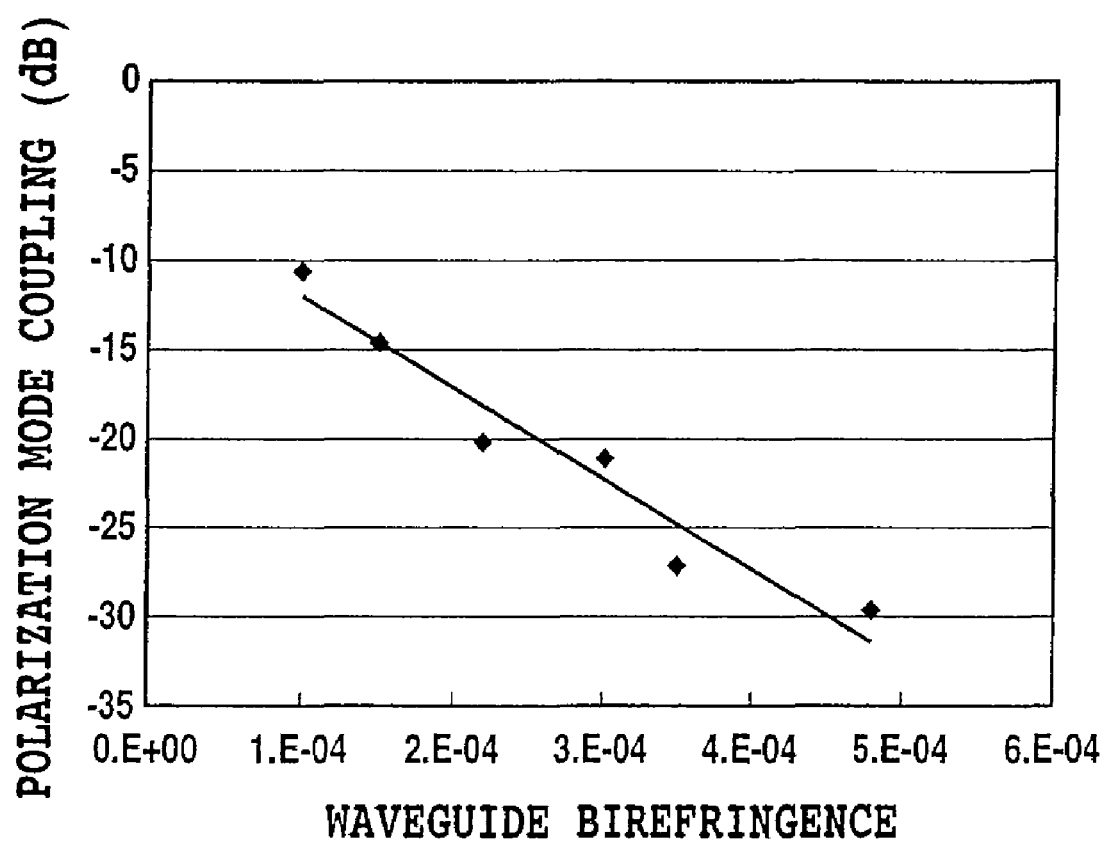
FIG. 4 is a characteristic diagram illustrating relationships between the waveguide birefringence and the polarization mode coupling for a directional coupler cross port.

Before describing a specific example of the embodiment in accordance with the present invention, firstly, the polarization mode coupling in the directional coupler sections is evaluated to demonstrate the PDL generation model described before. In addition, from the point of view that the polarization mode coupling may depend on the waveguide birefringence, the correlation between them is obtained. FIG. 4 illustrates the relationships between the polarization mode coupling and the waveguide birefringence in the directional coupler sections. Here, the axis of abscissas represents the waveguide birefringence, and the axis of ordinates represents the polarization mode coupling at the cross port output after passing through a single stage of the directional coupler. From FIG. 4, it is seen that the polarization mode coupling at the cross port output has strong correlation with the waveguide birefringence. The phenomenon can be interpreted in this way: "Because the mode coupling is inversely proportional to the propagation constant difference (waveguide birefringence) between the two modes (two polarization modes here) which bring about the coupling". In addition, some variation in the polarization mode coupling against the same waveguide birefringence in FIG. 4 can be interpreted in this way that because the polarization mode coupling changes owing to a variety of disturbances.

Assuming that the polarization mode coupling in the optical couplers 102 and 106, that is, |sin 2α|, be equal to or less than −25 dB, then the left side value of the foregoing expression (16) becomes equal to or less than −25 dB against the input level at the maximum. In other words, the optical level depending on the polarization of the input light is −25 dB against the input level. As a result, the PDL at the optical attenuation of 15 dB can be suppressed to less than or equal to the PDL obtained by the following expression (18).

$$PDL = ABS\left[10\log\left(\frac{10^{\frac{15}{10}} + 10^{\frac{25}{10}} \cdot \frac{1}{2}}{10^{\frac{15}{10}} - 10^{\frac{25}{10}} \cdot \frac{1}{2}}\right)\right] = 0.43 \quad (18)$$

Thus, the PDL at the optical attenuation of 15 dB can be suppressed to less than or equal to 0.5 dB.

It is found from FIG. 4 that the polarization mode coupling can be made less than or equal to −25 dB by setting the absolute value of the waveguide birefringence at a value equal to or greater than $3.5 \times 10^{-4}$. Thus, the PDL at the optical attenuation of 15 dB can be suppressed to less than or equal to 0.5 dB. Consequently, the present embodiment is characterized in that the polarization mode coupling of the first and second optical couplers 102 and 106 is made equal to or less than −25 dB, and further fact that the waveguide birefringence (absolute value) of the directional couplers constituting the first and second optical couplers can be made equal to or greater than $3.5 \times 10^{-4}$.

Figure 5:
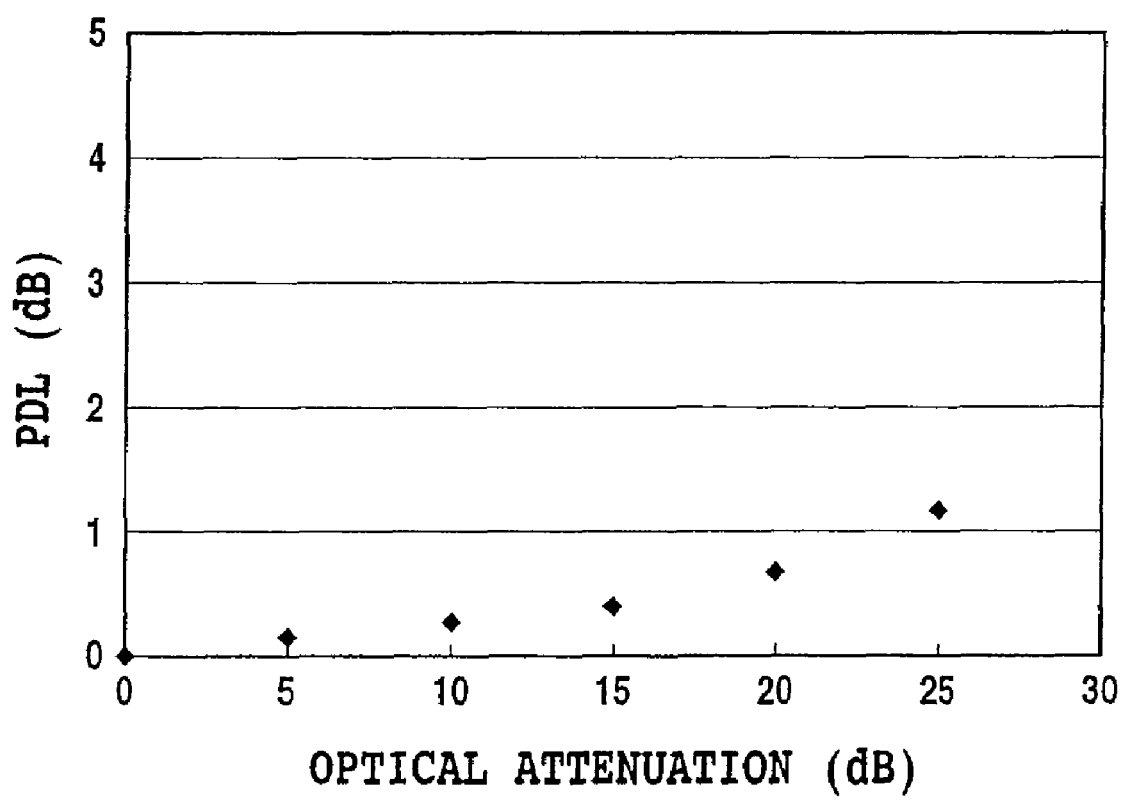
FIG. 5 is a characteristic diagram illustrating relationships between the optical attenuation and polarization dependent loss (PDL) in the planar lightwave circuit type variable optical attenuator of the first embodiment in accordance with the present invention.

FIG. 5 illustrates the correlation between the attenuation and PDL of the planar lightwave circuit type variable optical attenuator actually fabricated as the first embodiment in accordance with the present invention. For comparison with the third embodiment which will be described later, the present embodiment daringly sets the arm waveguide length at 11 mm, about 2.5 times the optical beat length, which is most distant from the integer multiple condition of the optical beat length.

The birefringence of the actually fabricated waveguides was $3.5 \times 10^{-4}$ when measured by a Senarmont measuring system. In this case, as shown in FIG. 5, the PDL at 15 dB attenuation is 0.4 dB, which fulfills the initial target value equal to or less than 0.5 dB.

The present embodiment is described by way of example of the device as shown in FIG. 1 and FIG. 2, which operates as the planar lightwave circuit type variable optical attenuator. The device shown in FIG. 1 and FIG. 2, however, can be utilized as an optical switch by using the phase difference between the two light beams entering the second optical coupler 106 at two values 0 and π. Likewise, the remaining embodiments in accordance with the present invention, which will be described below, can also be utilized as an optical switch.

SECOND EMBODIMENT

The second embodiment in accordance with the present invention has the same basic construction as the first embodiment in accordance with the present invention as shown in FIG. 1 and FIG. 2: it is a variable optical attenuator using its cross port output as the output waveguide for the input waveguide. The first embodiment and second embodiment differ from each other in the following. The first embodiment is characterized by "setting the absolute value of the waveguide birefringence of the directional couplers constituting the first and second optical couplers equal to or greater than $3.5 \times 10^{-4}$". In contrast, the second embodiment is characterized by "setting the length of the arm waveguides at an integer multiple of the optical beat length obtained by dividing the used optical wavelength by the waveguide birefringence".

The second embodiment corresponds to the polarization dependent condition given by the second expression of the foregoing expression (17).

The birefringence of the waveguide fabricated in the present embodiment was $1.2 \times 10^{-4}$. In this case, the optical beat length which causes the polarization with the used optical wavelength of 1.55 μm to make one revolution due to the waveguide birefringence is calculated as 12.9 mm. Thus, in the present embodiment, the length of the arm waveguide 104 is designed to be 12.9 mm corresponding to the optical beat length.

Figure 6:
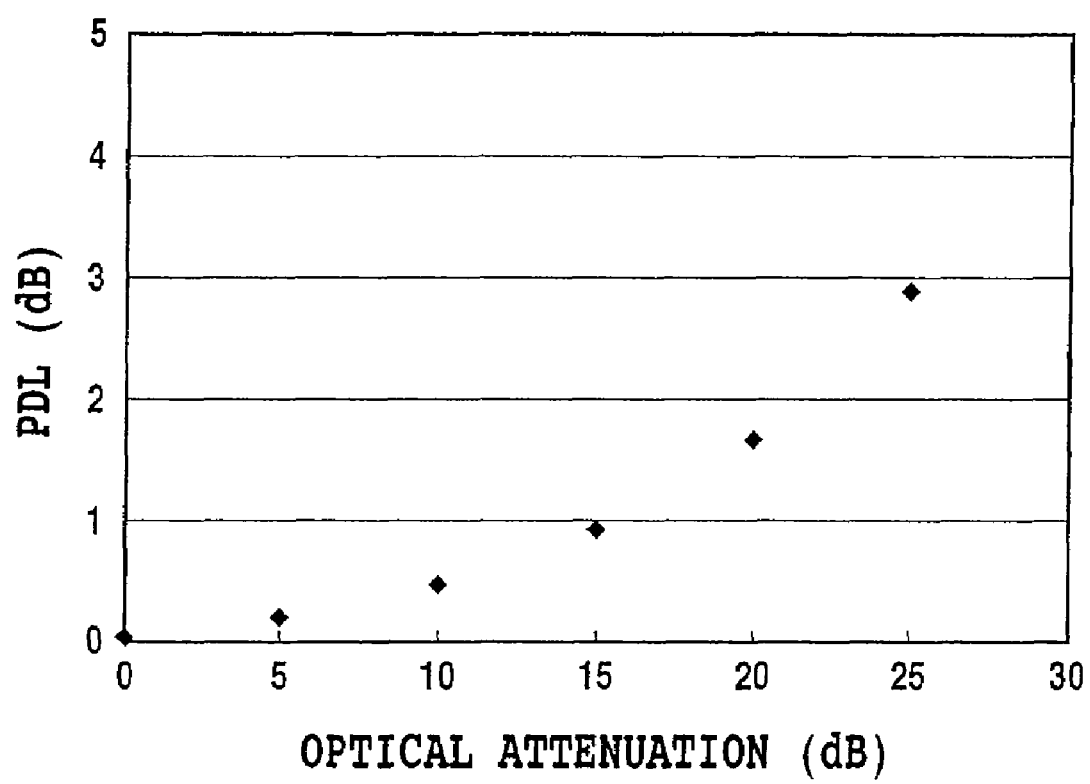
FIG. 6 is a characteristic diagram illustrating relationships between the optical attenuation and polarization dependent loss (PDL) in the variable optical attenuator of a second embodiment in accordance with the present invention.

FIG. 6 illustrates the correlation between the attenuation and PDL of the planar lightwave circuit type variable optical attenuator actually fabricated by applying the foregoing design conditions in the present embodiment. It is found from FIG. 6 that the PDL at 15 dB attenuation can be suppressed to 0.9 dB, which is considerably smaller than that of the conventional example.

THIRD EMBODIMENT

The third embodiment in accordance with the present invention is also a variable optical attenuator that employs the cross port output 107b as the output waveguide for the input waveguide 101a as the first and second embodiments in accordance with the present invention. Its basic construction is the same as that of FIG. 1 and FIG. 2. The third embodiment is characterized by having both the characteristic of the first embodiment and that of the second embodiment. That is, it has the characteristic of "setting the waveguide birefringence (the absolute value) of the directional couplers constituting the first and second optical couplers equal to or greater than $3.5 \times 10^{-4}$" and the characteristic of "setting the length of the arm waveguides at an integer multiple of the optical beat length obtained by dividing the used optical wavelength by the waveguide birefringence".

The birefringence of the actually fabricated waveguide was $3.5 \times 10^{-4}$. The length of the arm waveguides was set at 13.3 mm, three times the optical beat length.

Figure 7:
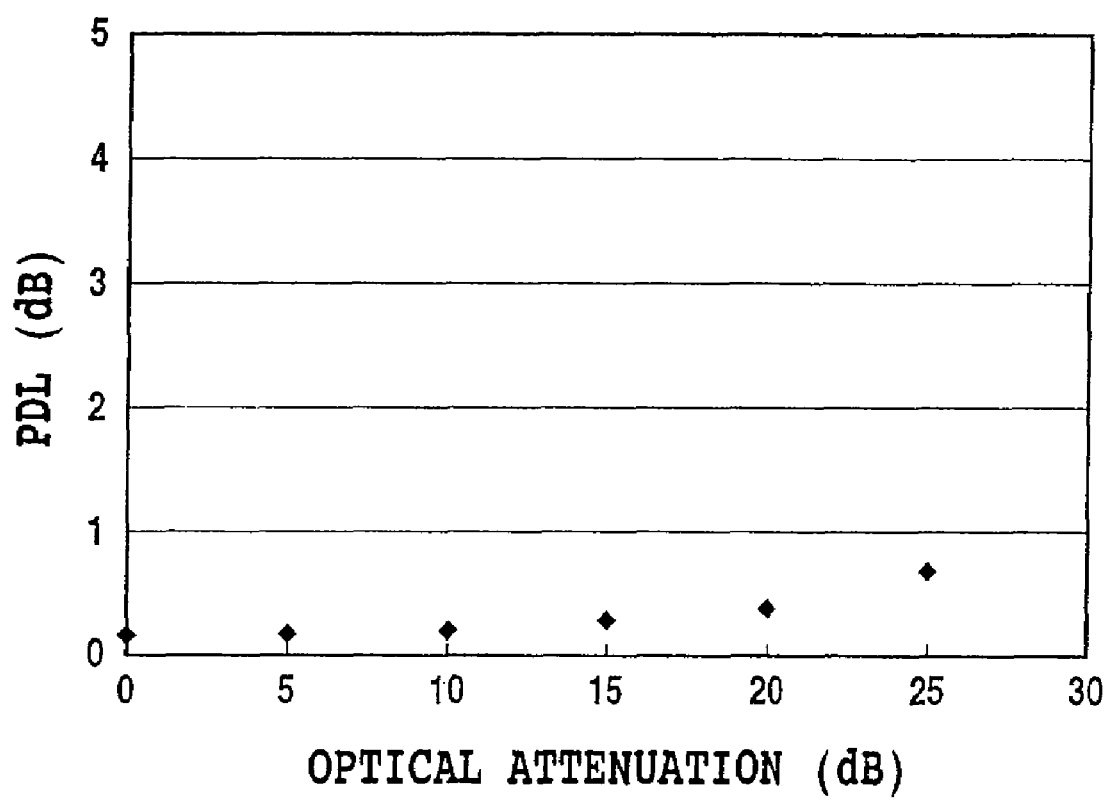
FIG. 7 is a characteristic diagram illustrating relationships between the optical attenuation and polarization dependent loss (PDL) in the planar lightwave circuit type variable optical attenuator of a third embodiment in accordance with the present invention.

FIG. 7 illustrates the correlation between the attenuation and PDL of the planar lightwave circuit type variable optical attenuator actually fabricated in the third embodiment. It is found from FIG. 7 that the PDL at 15 dB attenuation can be suppressed to 0.2 dB and the PDL at 25 dB attenuation can be suppressed to 0.6 dB, which are very small values. Thus, "setting the waveguide birefringence (the absolute value) of the directional couplers constituting the first and second optical couplers equal to or greater than $3.5 \times 10^{-4}$" and "setting the length of the arm waveguides at an integer multiple of the optical beat length obtained by dividing the used optical wavelength by the waveguide birefringence" can be designed independently of each other. Accordingly, it is preferable that the variable optical attenuator be fabricated in such a manner as to satisfy the two conditions at the same time.

OTHER EMBODIMENTS

The present invention has been described with respect to preferred embodiments. However, the embodiments of the present invention are not limited to the foregoing examples, but include all the modifications such as the replacement, changes, additions, increase or decrease in the number, or design changes of shapes of the components as long as they fall within the scope of the claims.

For example, although the foregoing embodiments in accordance with the present invention suppose the flame hydrolysis deposition method as a fabrication method, this is not essential. For example, as fabrication methods of the embedded waveguides other than the flame hydrolysis deposition method, there are vapor phase growth methods such as a CVD (Chemical Vapor Deposition) method and VPE (Vapor Phase Epitaxy) method, and a physical deposition method such as a sputtering method. The present invention is also effective when applying these fabrication methods.

In addition, although the foregoing embodiments in accordance with the present invention suppose the directional couplers as the optical couplers, this is not essential. For example, multimode interference couplers or asymmetric X-type couplers are also effective as the optical couplers constituting the present invention because they cause the polarization mode coupling in the regions where the cores are brought into close proximity to each other. In other words, the present invention is applicable to optical couplers that cause polarization mode coupling in the optical multi/demultiplexers independently of their shapes.

Furthermore, although the foregoing embodiments in accordance with the present invention are described by way of example of the optical interferometer employing the silica-based glass waveguides formed on the silicon substrate, this is not essential. For example, the principle of the present invention is also applicable to the devices where the waveguide material is other than the glass such as polyimide, silicone, semiconductor and $LiNbO_3$. In addition, the material of the substrate is not limited to silicon.

The invention claimed is:

1. A planar lightwave circuit type variable optical attenuator having waveguides formed on a substrate, said variable optical attenuator comprising:
    an input waveguide;
    a first optical coupler;
    a second optical coupler;
    two arm waveguides connecting said first optical coupler to said second optical coupler in series; and
    an output waveguide, wherein
    each of said first optical coupler and said second optical coupler is a directional coupler having a region in which said two arm waveguides are brought in close proximity to each other; and
    a polarization mode coupling in said first optical coupler and said second optical coupler is equal to or less than −25 dB.

2. A planar lightwave circuit type variable optical attenuator having waveguides formed on a substrate, said variable optical attenuator comprising:
    an input waveguide;
    a first optical coupler;
    a second optical coupler;
    two arm waveguides connecting said first optical coupler to said second optical coupler; and
    an output waveguide, wherein
    each of said first optical coupler and said second optical coupler is a directional coupler having a region in which said two arm waveguides are brought in close proximity to each other; and
    an absolute value of a waveguide birefringence at optical coupler sections constituting said first optical coupler and said second optical coupler is equal to or greater than $3.5 \times 10^{-4}$.

3. A planar lightwave circuit type variable optical attenuator having waveguides formed on a substrate, said variable optical attenuator comprising:
    an input waveguide;
    a first optical coupler;
    a second optical coupler;
    two arm waveguides connecting said first optical coupler to said second optical coupler; and
    an output waveguide, wherein
    each of said first optical coupler and said second optical coupler is a directional coupler having a region in which said two arm waveguides are brought in close proximity to each other; and
    a length of said arm waveguides is designed to be equal to an integer multiple of an optical beat length obtained by dividing a used optical wavelength by the waveguide birefringence.

4. The planar lightwave circuit type variable optical attenuator as claimed in claim 2, wherein a length of said arm waveguides is designed to be equal to an integer multiple of an optical beat length obtained by dividing a used optical wavelength by the waveguide birefringence.

5. The planar lightwave circuit type variable optical attenuator as claimed in claim 1, wherein
    at least one of said two arm waveguides has a phase controller; and
    said variable optical attenuator functions as a variable optical attenuator or optical switch.

6. The planar lightwave circuit type variable optical attenuator as claimed in claim 2, wherein
    at least one of said two arm waveguides has a phase controller; and
    said variable optical attenuator functions as a variable optical attenuator or optical switch.

7. The planar lightwave circuit type variable optical attenuator as claimed in claim 3, wherein
    at least one of said two arm waveguides has a phase controller; and
    said variable optical attenuator functions as a variable optical attenuator or optical switch.

8. The planar lightwave circuit type variable optical attenuator as claimed in claim 4, wherein
    at least one of said two arm waveguides has a phase controller; and
    said variable optical attenuator functions as a variable optical attenuator or optical switch.

9. The planar lightwave circuit type variable optical attenuator as claimed in claim 1, wherein
    said substrate is a silicon substrate, and said waveguides are silica-based glass waveguides.

10. The planar lightwave circuit type variable optical attenuator as claimed in claim 2, wherein said substrate is a silicon substrate, and said waveguides are silica-based glass waveguides.

11. The planar lightwave circuit type variable optical attenuator as claimed in claim 3, wherein said substrate is a silicon substrate, and said waveguides are silica-based glass waveguides.

12. The planar lightwave circuit type variable optical attenuator as claimed in claim 4, wherein said substrate is a silicon substrate, and said waveguides are silica-based glass waveguides.

13. A planar lightwave circuit type variable optical attenuator having waveguides formed on a substrate, the variable optical attenuator comprising:

an input waveguide;

a first optical coupler having an input portion and an output portion, the input portion of the first optical coupler being optically connected to the input waveguide;

a second optical coupler having an input portion and an output portion;

two arm waveguides, each of the arm waveguides optically connecting the output portion of the first optical coupler to the input portion of the second optical coupler; and an output waveguide connected to the output portion of the second optical coupler, wherein each of the first optical coupler and the second optical coupler is a directional coupler having a region in which the two arm waveguides are disposed in close proximity to each other; and a polarization mode coupling in the first optical coupler and the second optical coupler is equal to or less than −25 dB.

* * * * *